US012647014B2

(12) United States Patent
Mariani

(10) Patent No.: US 12,647,014 B2
(45) Date of Patent: Jun. 2, 2026

(54) COMBINED FEEDFORWARD AND FIXED TIME DELAY

(71) Applicant: STMicroelectronics International N.V., Geneva (CH)

(72) Inventor: Adalberto Lino Mariani, Milan (IT)

(73) Assignee: STMicroelectronics International N.V., Geneva (CH)

( * ) Notice: Subject to any disclaimer, the term of this patent is extended or adjusted under 35 U.S.C. 154(b) by 244 days.

(21) Appl. No.: 18/543,634

(22) Filed: Dec. 18, 2023

(65) Prior Publication Data
US 2025/0202357 A1     Jun. 19, 2025

(51) Int. Cl.
*H02M 3/158* (2006.01)
*H02M 1/00* (2006.01)
(52) U.S. Cl.
CPC ......... *H02M 1/0003* (2021.05); *H02M 3/158* (2013.01)
(58) Field of Classification Search
CPC ..... H02M 3/158; H02M 1/0003; H02M 1/156
See application file for complete search history.

(56) References Cited

U.S. PATENT DOCUMENTS

| | | | |
|---|---|---|---|
| 2007/0018618 A1* | 1/2007 | Endo ................... | H02M 3/1588 |
| | | | 323/224 |
| 2021/0099091 A1 | 4/2021 | Sato et al. | |
| 2021/0211047 A1 | 7/2021 | Zhao et al. | |
| 2021/0384830 A1* | 12/2021 | Bertolini ............ | H02M 1/0025 |
| 2023/0013594 A1 | 1/2023 | Kawano | |

FOREIGN PATENT DOCUMENTS

| | | |
|---|---|---|
| CN | 101938157 B | 3/2014 |
| JP | 66956636 B2 | 5/2020 |

* cited by examiner

*Primary Examiner* — Alex Torres-Rivera
(74) *Attorney, Agent, or Firm* — Slater Matsil, LLP

(57) ABSTRACT

According to an embodiment, a delay circuit for a control logic in a converter is provided. The delay circuit includes a first timer circuit having a transconductance amplifier and a first capacitor. The delay circuit includes a second timer circuit coupled to the first timer circuit. The second timer circuit includes a first current generator, a second current generator, and a second capacitor. The second timer circuit is configured to receive an output signal from the first timer circuit to modify a charging current provided by the second current generator or a sum of the first current generator and the second current generator to charge the second capacitor in the second timer circuit.

20 Claims, 7 Drawing Sheets

COMBINED FEEDFORWARD AND FIXED TIME DELAY

TECHNICAL FIELD

The present disclosure generally relates to electronic circuits and, in particular embodiments, to a delay circuit.

BACKGROUND

Switching DC-DC converters are integral to modern power electronics, converting one DC voltage level to another through rapid switching. This switching, often facilitated by Pulse Width Modulation (PWM), enables precise control over the output voltage. Generally, a delay circuit is coupled to a control logic that provides the timing signals to the control logic. The control logic generates control signals at the control terminals of the switches based on the timing signals from the delay circuit.

In a synchronous switching converter, the control logic plays an instrumental role in determining the operational efficiency and safety of the circuit. At the core of this control logic is the Pulse Width Modulation (PWM) Controller. It is responsible for generating the primary control signal for the high-side switch. The width of the pulse produced by the PWM dictates the ON-time of the high-side switch and, subsequently, the duty cycle of the converter.

However, smooth and safe operation is not just about the high-side switch alone. The converter also incorporates a low-side switch, which needs to operate in harmony with the high-side counterpart.

To achieve this precise delay, a timing delay circuit becomes indispensable. While a basic RC network, which capitalizes on the time constant produced by a resistor and capacitor, can generate a simple delay, precision often demands more sophisticated solutions. Dedicated delay ICs or digital delay elements are often employed to ensure the delay is precise and adjustable to suit specific requirements.

SUMMARY

Technical advantages are generally achieved by embodiments of this disclosure, which describe a delay circuit.

A first aspect relates to a delay circuit for a control logic in a converter. The delay circuit includes a first timer circuit having a transconductance amplifier and a first capacitor. The first timer circuit includes a first transfer characteristic equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter. The delay circuit includes a second timer circuit coupled to the first timer circuit. The second timer circuit includes a first current generator, a second current generator, and a second capacitor. The second timer circuit is configured to receive an output signal from the first timer circuit to modify a charging current provided by the second current generator or a sum of the first current generator and the second current generator to charge the second capacitor in the second timer circuit. The second timer circuit has a second transfer characteristic equal to $$\beta - \frac{\alpha}{V_{in}} \text{ or } \beta - \frac{\alpha \times V_{out}}{V_{in}},$$

where $\beta$ is a second multiplier factor associated with the first current generator.

A second aspect relates to a method of operating a delay circuit for a control logic in a converter. The method includes receiving, by the delay circuit, a start command signal from the control logic; generating, by a first timer circuit of the delay circuit, a first delay signal, the first timer circuit comprising a transconductance amplifier and a first capacitor, the first timer circuit having a first transfer characteristic equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter; receiving, by a second timer circuit of the delay circuit, the first delay signal and the start command signal from the first timer circuit, the second timer circuit comprising a first current generator, a second current generator, and a second capacitor; modifying a charging current provided by the second current generator or a sum of the first current generator and the second current generator for charging the second capacitor in the second timer circuit based on the first delay signal; and generating, by the second timer circuit, a second delay signal used by the control logic to generate control signals for switching elements of the converter, the second timer circuit having a second transfer characteristic equal to $$\beta - \frac{\alpha}{V_{in}} \text{ or } \beta - \frac{\alpha \times V_{out}}{V_{in}},$$

where $\beta$ is a second multiplier factor associated with the first current generator.

A third aspect relates to a converter. The converter includes a switching element; a control logic configured to control the switching operations of the switching element; and a delay circuit coupled to the control logic. The delay circuit includes a first timer circuit having a transconductance amplifier and a first capacitor. The first timer circuit has a first transfer characteristic equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter. The delay circuit further includes a second timer circuit coupled to the first timer circuit. The second timer circuit has a first current generator, a second current generator, and a second capacitor. The second timer circuit is configured to receive an output signal from the first timer circuit to modify a charging current provided by the second current generator or a sum of the first current generator and the second current generator to charge the second capacitor in the second timer circuit. The second timer circuit has a second transfer characteristic equal to $$\beta - \frac{\alpha}{V_{in}}\beta - \frac{\alpha \times V_{out}}{V_{in}},$$

where $\beta$ is a second multiplier factor associated with the first current generator.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a timing circuit for a buck converter, it should also be appreciated that these inventive aspects may also apply to any other circuit that can employ a timing circuit.

Figure 1:
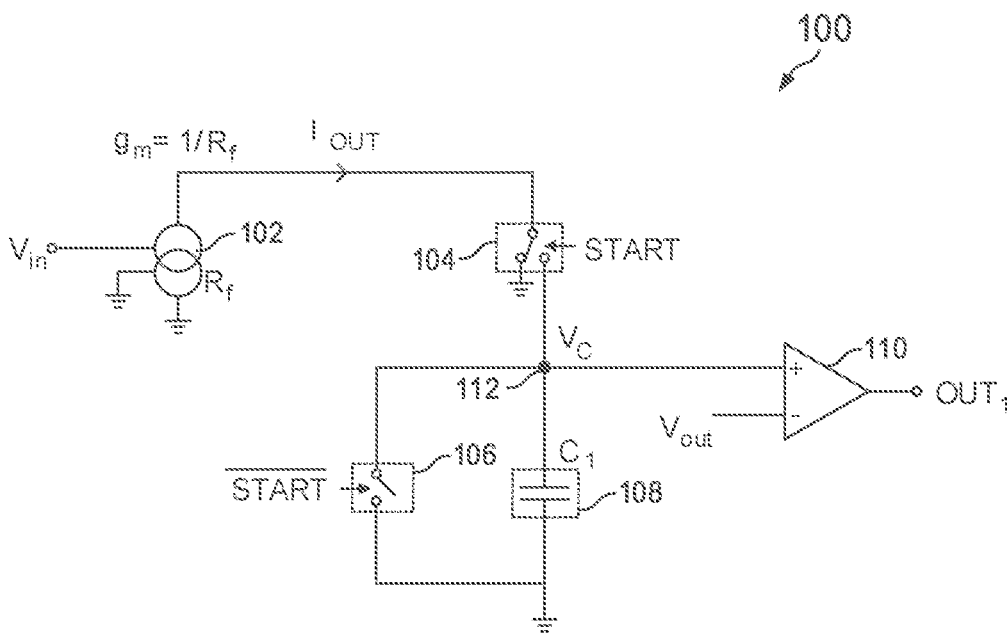
FIG. 1 is a schematic of a feedforward delay circuit.

FIG. 1 illustrates a schematic of a feedforward delay circuit 100. The feedforward delay circuit 100 includes a transconductance amplifier 102, a first switch 104, a second switch 106, a capacitor ($C_1$) 108, and a comparator 110. In embodiments, feedforward delay circuit 100 is used by a control logic in a converter for a constant ON-time (COT) control mechanism to have a constant steady-state frequency.

In the COT control mechanism, the regulator's switch, usually a MOSFET, is activated for a fixed duration during each cycle. This duration remains constant, irrespective of changes in the input or output voltage. The unique characteristic of COT is that while the ON period remains constant, the OFF period adjusts based on feedback from the output to ensure the output voltage remains regulated.

The transconductance amplifier 102 (also referred to as voltage-to-current converter) takes the input voltage ($V_{in}$) and produces an output current ($I_{out}$) that is proportional to the input voltage ($V_{in}$). Transconductance amplifier 102 includes a feedforward resistor ($R_f$). The proportionality constant ($g_m$) of the transconductance amplifier 102, also referred to as transconductance, is inversely proportional to the feedforward resistor ($R_f$): $g_m \approx 1/R_f$. The transconductance ($g_m$) represents the rate of change of the output current ($I_{out}$) with respect to the input voltage $$(V_{in}): g_m = \frac{\Delta I_{out}}{\Delta V_{in}},$$

where $\Delta I_{out}$ is the change in output current and $\Delta V_{in}$ is the change in input voltage.

The operation of the first switch 104 is controlled by the start command signal (START). The start command signal (START) can be associated with a start sequence of a DC-DC converter. In embodiments, the start command signal (START) is tied to the control signal coupled to the control terminal of a high-side switch in a dual-switch power converter.

In a first configuration, corresponding to the start command signal (START) being at a logic level low, the first switch 104 is configured to couple the output of the transconductance amplifier 102 to reference ground. In a second configuration, corresponding to the start command signal (START) being at a logic level high, the first switch 104 is configured to couple the output of the transconductance amplifier 102 to the non-inverting input of the comparator 110.

The operation of the second switch 106 is controlled by the inverted value of the start command signal ($\overline{\text{START}}$). In the first configuration, corresponding to the inverted value of the start command signal ($\overline{\text{START}}$) being at a logic level high, the second switch 106 is in the CLOSED position and the non-inverting input of the comparator 110 is coupled to reference ground. In the second configuration, corresponding to the inverted value of the start command signal ($\overline{\text{START}}$) being at a logic level low, the second switch 106 is in the OPEN position and the non-inverting input of comparator 110 is coupled to the output of the transconductance amplifier 102.

Operationally, when the start command signal (START) rises, the feedforward delay circuit 100 is configured to couple the transconductance amplifier 102 to the non-inverting input of comparator 110. The output current ($I_{out}$) from the transconductance amplifier 102 begins the charging of capacitor ($C_1$) 108. When the charge stored in capacitor ($C_1$) 108 (having a terminal coupled with node 112) exceeds the output voltage ($V_{out}$), the output signal ($OUT_1$) of comparator 110 rises, with a delay ($T_{delay1}$) from initial start time, represented by equation (1):

$$T_{delay1} = \frac{V_{out}}{V_{in}} \times R_f \times C_1.$$

Figure 2:
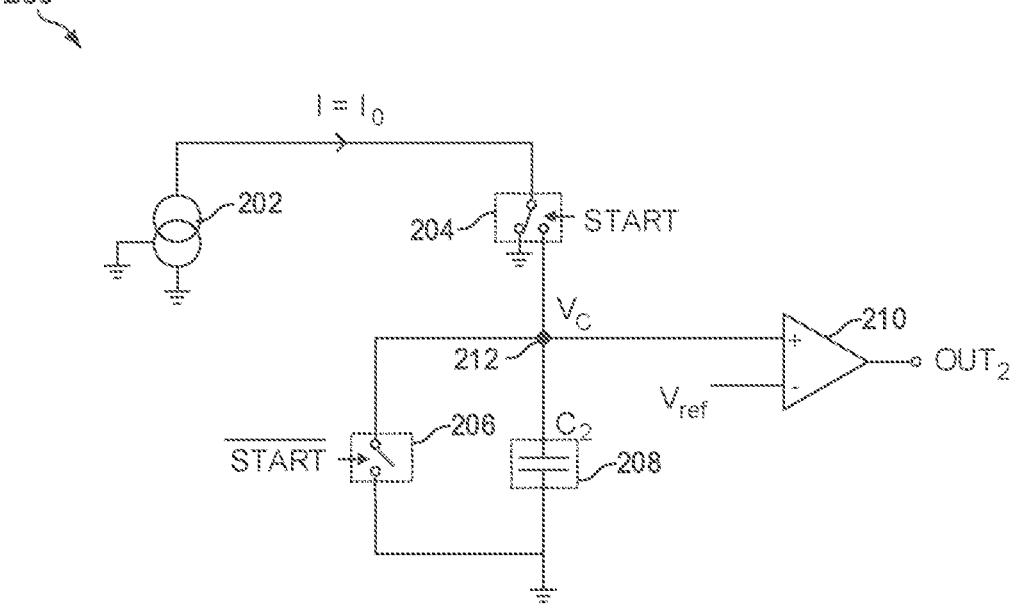
FIG. 2 is a schematic of a fixed time delay circuit.

FIG. 2 illustrates a schematic of a fixed time delay circuit 200. The fixed time delay circuit 200 includes a current generator 202, a first switch 204, a second switch 206, a capacitor $(C_2)$ 208, and a comparator 210. Current generator 202 is configured to generate a current $(I_0)$. In embodiments, fixed time delay circuit 200 is used by a control logic in a converter for constant OFF-time (COF) control mechanism.

In the COF control mechanism, in contrast with the COT control mechanism, the OFF period remains constant. Once the high-side switch is turned off, it remains OFF or a fixed period. The ON time varies based on the feedback to ensure the output voltage $(V_{out})$ remains at the desired level.

The COT control mechanism is beneficial when the duty cycle is low; however, it is disadvantageous when it is high. For example, COT cannot have 100% duty cycle because, for stability reasons, there is a fixed ON time and a minimum OFF time. Accordingly, maximum discharge cannot be 100%. In an application where the output voltage $(V_{out})$ is as high as the input voltage $(V_{in})$, COT is not used. In COF, having a substantially constant steady switching frequency while varying the input voltage $(V_{in})$ and the output voltage $(V_{out})$ is difficult to achieve.

The operation of the first switch 204 is controlled by the start command signal (START). In a first configuration, corresponding to the start command signal (START) being at a logic level low, the first switch 204 is configured to couple the output of the current generator 202 to reference ground. In a second configuration, corresponding to the start command signal (START) being at a logic level high, the first switch 204 is configured to couple the output of the current generator 202 to the non-inverting input of the comparator 210.

The operation of the second switch 206 is controlled by the inverted value of the start command signal ($\overline{START}$). In the first configuration, corresponding to the inverted value of the start command signal ($\overline{START}$) being at a logic level high, the second switch 206 is in the CLOSED position and the non-inverting input of the comparator 210 is coupled to reference ground. In the second configuration, corresponding to the inverted value of the start command signal ($\overline{START}$) being at a logic level low, the second switch 206 is in the OPEN position, and the non-inverting input of the comparator 110 is coupled to the output of the current generator 202 through node 212 $(V_c)$.

Operationally, when the start command signal (START) rises, the fixed time delay circuit 200 is configured to couple the current generator 202 to the non-inverting input of comparator 210 through first switch 204. The current $(I_0)$ from the current generator 202 begins the charging of capacitor 208. When the charge stored in capacitor $(C_2)$ 208 (having a terminal coupled with node 212) exceeds the reference voltage $(V_{ref})$, the output signal $(OUT_2)$ of comparator 210 rises, with a delay $(T_{delay2})$ from initial start time, represented by equation (2):

$$T_{delay2} = \frac{V_{ref}}{I_0} \times C_2.$$

Figure 3:
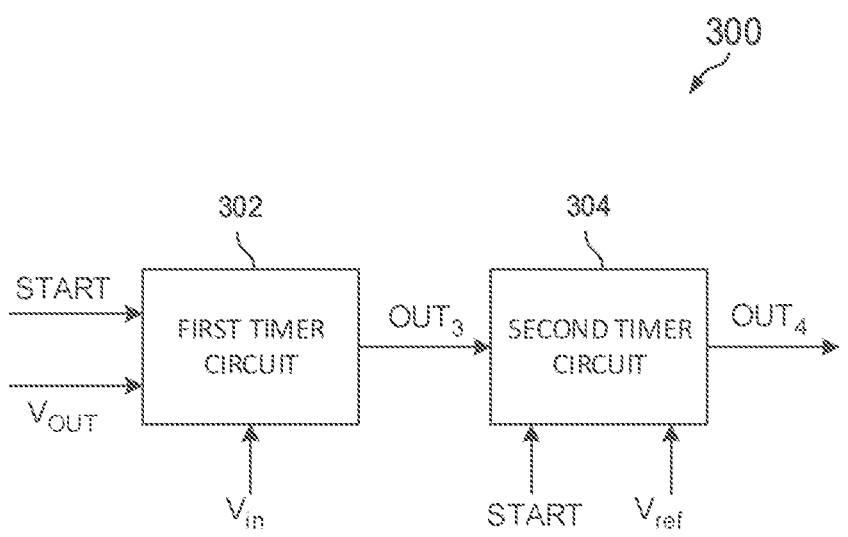
FIG. 3 is a block diagram of an embodiment delay circuit.

FIG. 3 illustrates a block diagram of an embodiment delay circuit 300. Delay circuit 300 includes a first timer circuit 302 coupled to a second timer circuit 304. Advantageously, the delay circuit 300 allows the control logic to operate under COF control mechanism to achieve constant steady state switching frequency.

The first timer circuit 302 receives the output voltage $(V_{out})$, the start command signal (START), and the input voltage $(V_{in})$. The first timer circuit 302 generates the output signal $(OUT_3)$, fed to the second timer circuit 304. The second timer circuit 304 receives the output signal $(OUT_3)$, the start command signal (START), and the reference voltage $(V_{ref})$. The second timer circuit 304 generates an output signal $(OUT_4)$. In embodiments, the output signal $(OUT_4)$ is provided from the delay circuit 300 to a control logic of a switching converter to generate control signals for the ON and OFF switching of the switches of the switching converter.

The output signal $(OUT_3)$ of the first timer circuit 302 is used to configure the charging current of the second timer circuit 304. Delay circuit 300 is configured to have a time delay, represented as equation (3):

$$T_{delay3} = \frac{V_{ref}}{I_0} \times C_1 - \frac{V_{out}}{V_{in}} \times R_f \times C_1.$$

In embodiments, the first timer circuit 302 has a transfer characteristic of $$\frac{\alpha}{V_{in}} \text{ or } \frac{\alpha \times V_{out}}{V_{in}},$$

where $\alpha$ is a first multiplier factor associated with the first timer circuit 302. In embodiments, the first multiplier factor is a fixed constant value. The second timer circuit 304 has the transfer characteristic of $$\beta - \frac{\alpha}{V_{in}} \text{ or } \beta - \frac{\alpha \times V_{out}}{V_{in}},$$

where $\beta$ is a second multiplier factor associated with the second timer circuit 304. In embodiments, the second multiplier factor is a fixed constant value.

Figure 4:
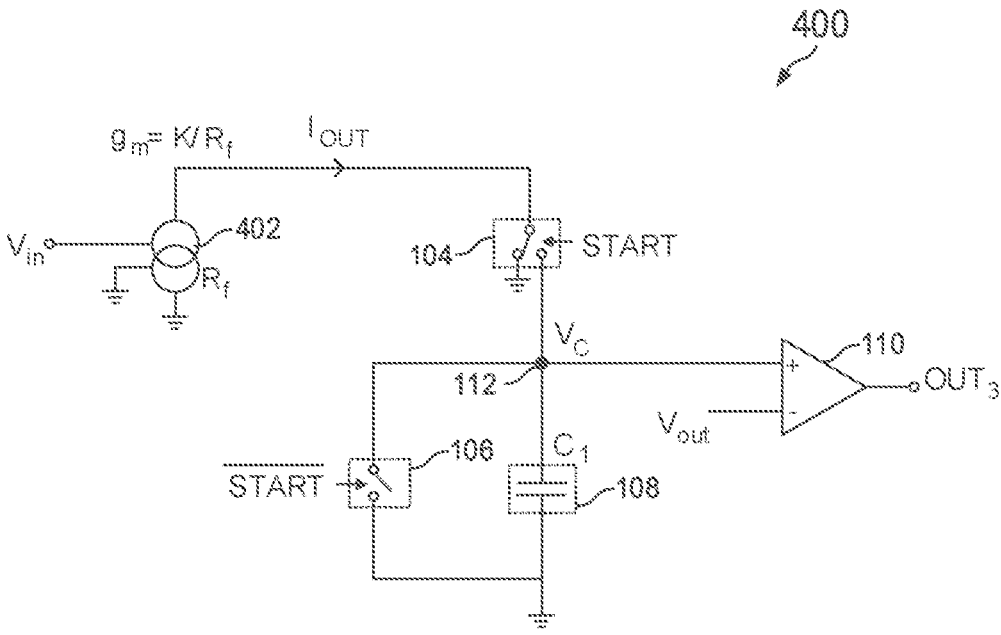
FIG. 4 is a schematic of an embodiment feedforward delay circuit.

FIG. 4 illustrates a schematic of an embodiment feedforward delay circuit 400. In embodiments, feedforward delay circuit 400 is implemented as the first timer circuit 302 of the delay circuit 300. Feedforward delay circuit 400 includes a transconductance amplifier 402, the first switch 104, the second switch 106, the capacitor $(C_1)$ 108, and the comparator 110, which may (or may not) be arranged as shown. Feedforward delay circuit 400 may include additional components not shown. For example, feedforward delay circuit 400 may include one or more inverters or other types of logic gates to invert the start command signal (START).

In feedforward delay circuit 400, the transconductance $(g_m)$ of the transconductance amplifier 402 includes the K multiplier factor such that the transconductance $(g_m)$ of the transconductance amplifier 402 is proportional to the K multiplier factor and the feedforward resistor $(R_f)$, $g_m \approx K/R_f$. In embodiments, the K multiplier factor is a fixed constant value.

Operationally, when the start command signal (START) rises, the feedforward delay circuit 400 is configured to couple the output of the transconductance amplifier 402 to the non-inverting input of comparator 110. The output current $(I_{out})$ from the transconductance amplifier 402 begins the charging of capacitor ($C_1$) 108. When the charge stored in capacitor ($C_1$) 108 (having a terminal coupled with node 112) exceeds the output voltage ($V_{out}$), the output signal ($OUT_3$) of comparator 110 rises, with a time delay ($T_{delay4}$) from initial start time, represented by equation (4):

$$T_{delay4} = \frac{V_{out}}{V_{in}} \times \frac{R_f \times C_1}{K},$$

where $C_1$ is the capacitance of the capacitor 108.

Figure 5:
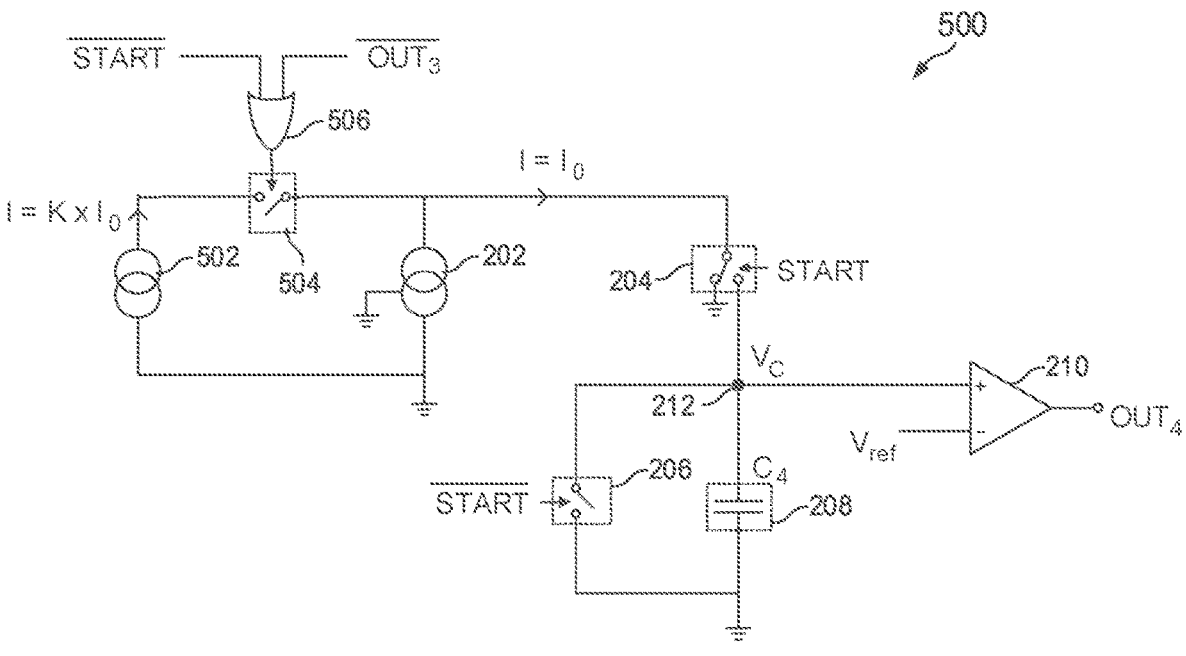
FIG. 5 is a schematic of an embodiment fixed time delay circuit.
Figure 6:
FIG. 6 is a timing diagram detailing the operation of the fixed time delay circuit of FIG. 5.
Figure 6:
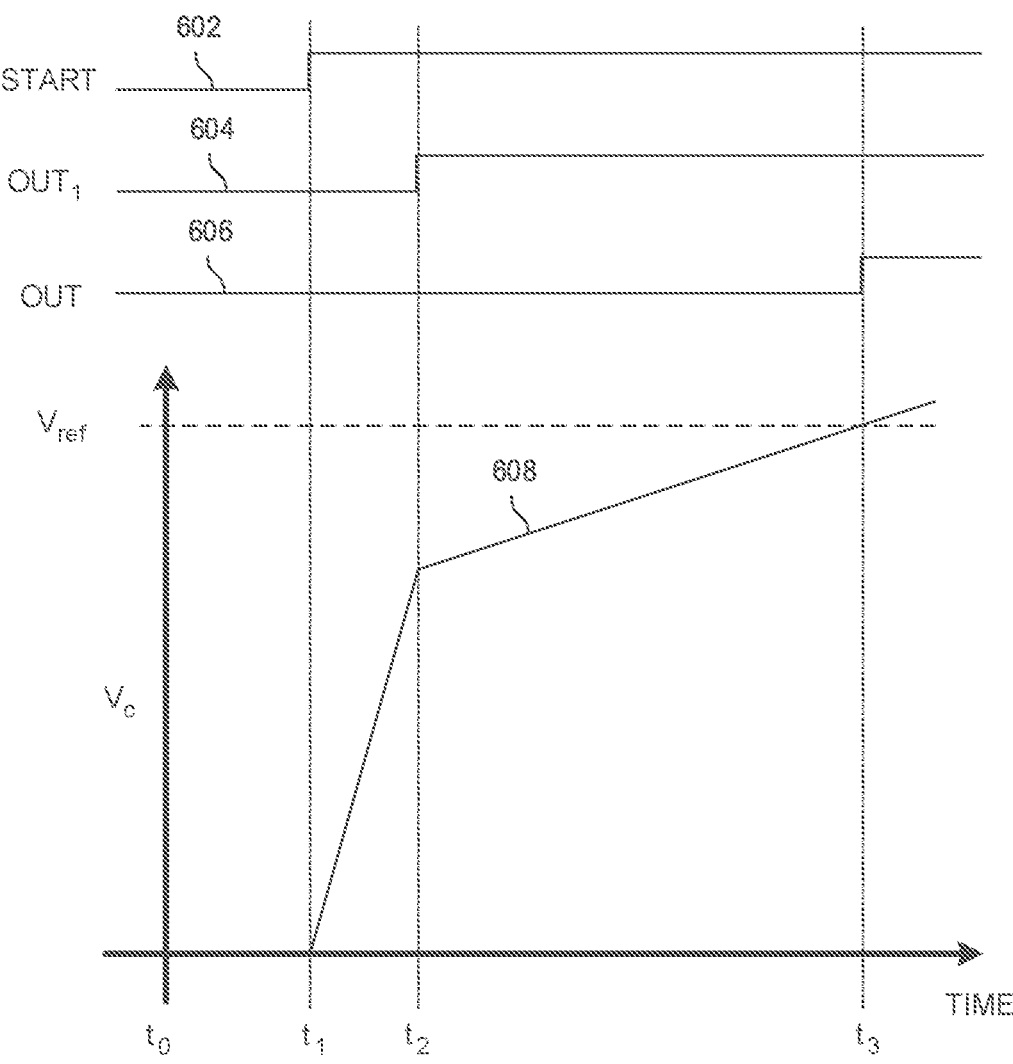

FIG. 5 illustrates a schematic of an embodiment fixed time delay circuit 500. FIG. 6 illustrates a timing diagram 600 detailing the operation of the fixed time delay circuit 500. In embodiments, fixed time delay circuit 500 is implemented as the second timer circuit 304 of the delay circuit 300. The fixed time delay circuit 500 includes the current generator 202, the first switch 204, the second switch 206, the capacitor ($C_2$) 208, the comparator 210, a second current generator 502, a third switch 504, and an OR gate 506, which may (or may not) be arranged as shown. Fixed time delay circuit 500 may include additional components not shown. For example, fixed time delay circuit 500 may include one or more inverters or other types of logic gate to invert the start command signal (START) and the output signal ($OUT_3$) from the feedforward delay circuit 400.

The operation of the third switch 504 is controlled by the OR gate logic of the inverted value of the start command signal ($\overline{START}$) and the inverted output signal ($\overline{OUT_3}$) of the feedforward delay circuit 400 through the OR gate 506.

Operationally, at time $t_0$, the start command signal (START) 602 and the output signal ($OUT_3$) 604 of the feedforward delay circuit 400 are at a logic level low. The fixed time delay circuit 500 is configured to couple the output of the transconductance amplifier 502 to reference ground through the first switch 204, arrange the second switch 206 in the CLOSED position, and arrange the third switch 504 in the CLOSED position.

At time $t_1$, the start command signal (START) 602 transitions from the logic level low to a logic level high. Accordingly, the inverted value of the start command signal ($\overline{START}$) transitions from a logic level high to a logic level low. The fixed time delay circuit 500 is configured to arrange the second switch 206 in the OPEN position. As the inverted value of the start command signal ($\overline{START}$) at the first input of the OR gate 406 is at a logic level low and the inverted output signal ($\overline{OUT_3}$) from the feedforward delay circuit 400 at the second input of the OR gate 506 is at a logic level high (i.e., the output signal ($OUT_3$) 604 is at a logic level low), the output of the OR gate 506 is at a logic level high and the third switch 504 is arranged in the CLOSED position.

The fixed time delay circuit 500 is further configured to couple the node 212 at the non-inverting input of comparator 210 to the current generator 202 and the second current generator 502 through the first switch 204 and the third switch 504, respectively. The capacitor ($C_2$) 208 begins charging by the sum current of the current ($I_0$) provided by the current generator 202 and the current ($K \times I_0$) provided by the second current generator 502 (i.e., the total current of ($(K+1) \times I_0$), which is reflected by the voltage ($V_c$) 608 at node 112.

At time $t_2$, the output signal ($OUT_3$) from the feedforward delay circuit 400 transitions from a logic level low to a logic level high. Thus, the inverted output signal ($\overline{OUT_3}$) at the second input of the OR gate 506 is at a logic level low. The inverted value of the start command signal ($\overline{START}$) at the first input of the OR gate 506 is also at a logic level low. Thus, the third switch 504 transitions to an OPEN position. The fixed time delay circuit 500 is configured to couple node 212 at the non-inverting input of comparator 210 to the current generator 202 through the first switch 204. Accordingly, capacitor ($C_2$) 208 continues charging solely through the current ($I_0$) provided by the current generator 202, which is reflected by the voltage ($V_c$) 608 at node 112.

At time $t_3$, the voltage ($V_c$) 608 at node 112 exceeds the reference voltage ($V_{ref}$). Accordingly, the output signal ($OUT_4$) of comparator 210 rises. As the current of (($K+1) \times I_0$) to charge capacitor ($C_2$) 208 between time $t_1$ and time $t_2$ is greater than the current ($I_0$) to charge capacitor ($C_2$) 208 between time $t_2$ and time $t_3$, the rate of charge stored in capacitor ($C_2$) 208 decreases after time $t_2$, which is reflected in the change of slope of the voltage ($V_c$) 608 at node 112 in FIG. 6.

The relationship between the charge (Q) injected into a capacitor from current (I) over time (t) can be represented by equation (5): $Q = I \times t$. Accordingly, the charge ($Q_1$) injected to capacitor ($C_2$) 208 from time $t_1$ to time $t_2$ can be calculated using equation (5): $Q_1 = ((K+1) \times I_0) \times T_{delay4}$, which from equation (4) can be shown as equation (6):

$$Q_1 = ((K+1) \times I_0) \times \frac{V_{out}}{V_{in}} \times \frac{R_f \times C_1}{K}.$$

At time $t_3$, the charge ($Q_{TOT}$) injected to capacitor 208 can be calculated using equation (6): $Q_{TOT} = Q_1 + I_0 \times (T_{delay5} - T_{delay4})$, where $T_{delay5}$ is the time from time $t_1$ to time $t_3$, (delay of the combined feedforward delay circuit 400 and fixed time delay circuit 500) which from equations (6) and (4) can be shown as equation (7):

$$Q_{TOT} = \frac{V_{out}}{V_{in}} \times \frac{R_f \times C_1}{K} \times ((K+1) \times I_0) + I_0 \times \left(T_{delay5} - \frac{V_{out}}{V_{in}} \times \frac{R_f \times C_1}{K}\right).$$

The relationship between charge (Q) injected into a capacitor with a capacitance (C) when the voltage across the capacitor is voltage (V) can be represented by equation (8): $Q = C \times V$. Accordingly, at time $t_3$, the time delay ($T_{delay5}$) can be calculated by substituting the total charge ($Q_{TOT}$) with $V_{ref} \times C_2$.

Based on equation (8) and (7), the charge ($Q_{TOT}$) injected to capacitor 208 at time $t_3$ can be represented by equation (9): $V_{ref} \times C_2 = Q_{TOT}$, which can be rewritten as equation (10):

$$T_{delay5} = \frac{V_{ref}}{I_0} \times C_2 - \frac{V_{out}}{V_{in}} \times \frac{R_f \times C_1}{K} \times (K+1) + \frac{V_{out}}{V_{in}} \times \frac{R_f \times C_1}{K} =$$
$$\frac{V_{ref}}{I_0} \times C_2 - \frac{V_{out}}{V_{in}} \times \frac{R_f \times C_1}{K} \times K.$$

Equation (10) can be simplified as equation (11):

$$T_{delay5} = \frac{V_{ref}}{I_0} \times C_2 - \frac{V_{out}}{V_{in}} \times R_f \times C_1.$$

As shown in equation (10), the K multiplier factor does not affect the time delay ($T_{delay5}$) value. However, equation (10) is only valid when the time delay ($T_{delay5}$) is greater than or equal to the delay ($T_{delay4}$) of the feedforward delay circuit 400 (i.e., $T_{delay5} \geq T_{delay4}$). The operating range of the timer circuit of the combined feedforward delay circuit 400 and fixed time delay circuit 500 can be improved by increasing the K multiplier factor. Disadvantageously, by doing so, the delay of the comparator 208 has a larger impact on timer linearity versus the input voltage ($V_{in}$).

Considering $T_{delay5} \geq T_{delay4}$, the operating range of the timer circuit of the combined feedforward delay circuit 400 and fixed time delay circuit 500 can be represented as equation (12):

$$\frac{V_{ref}}{I_0} \times C_2 - \frac{V_{out}}{V_{in}} \times R_f \times C_1 \geq \frac{V_{out}}{V_{in}} \times \frac{R_f \times C_1}{K},$$

which can be rewritten as equation (13):

$$\frac{V_{out}}{V_{in}} R_f \times C_1 \times \left(1 + \frac{1}{K}\right) \leq \frac{V_{ref}}{I_0} \times C_2.$$

Considering $T_{delay5} \geq 0$, equation (14):

$$\frac{V_{out}}{V_{in}} \times R_f \times C_1 \leq \frac{V_{ref}}{I_0} \times C_2,$$

ensures that equation (13) is feasible, and for large values of K, the $T_{delay5}$ can be as low as zero. By using a large value for the K multiplier factor, the operating range of the timer circuit can be reduced as low as $T_{delay5} \approx 0$.

In an embodiment, the feedforward delay circuit 400 is implemented as the first timer circuit 302 of the delay circuit 300 and fixed time delay circuit 500 is implemented as the second timer circuit 304 of the delay circuit 300.

Figure 7:
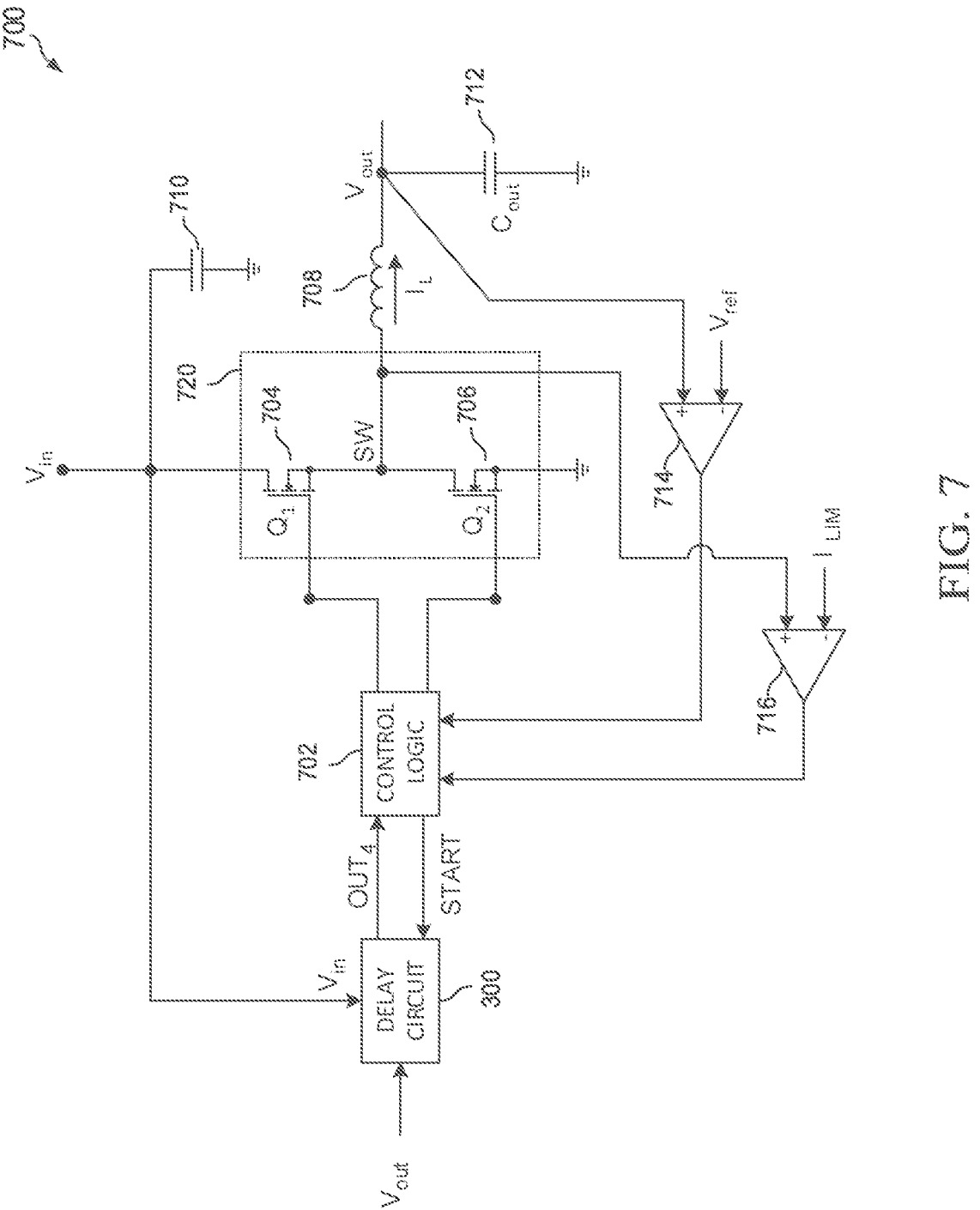
FIG. 7 is a schematic of an embodiment converter represented as a buck (step-down) converter type of a switched-mode power supply (SMPS)

FIG. 7 illustrates a schematic of an embodiment converter 700 represented as a buck (step-down) converter type of a switched-mode power supply (SMPS). Converter 700 includes the delay circuit 300, a control logic 702, a switching element 720, an inductor (L) 708, an optional input capacitor ($C_{in}$) 710, an output capacitor ($C_{out}$) 712, a first comparator 714, and a second comparator 716, which may (or may not) be arranged as shown. Converter 700 may include additional components not shown. For example, converter 700 may include a circuit providing a minimal on-time to the control logic 702 for one or more switching elements of the switching element 720. As another example, converter 700 may include a respective gate driver coupled between the output of the control logic 702 and each switching element of the switching element 720.

The switching element 720 includes a first transistor ($Q_1$) 704 (i.e., the high-side switch) and a second transistor ($Q_2$) 706 (i.e., the low-side switch). The first transistor ($Q_1$) 704 is coupled between the input source ($V_{in}$) and the switching node (SW). The second transistor ($Q_2$) 706 is coupled between the switching node (SW) and reference ground. The first transistor ($Q_1$) 704 and the second transistor ($Q_2$) 706 can be of the metal-oxide silicon field-effect transistors (MOSFETs) type. The first transistor ($Q_1$) 704 and the second transistor ($Q_2$) 706 can be n-channel type MOSFETs.

The inductor (L) 708 is coupled between the switching node (SW) and an output terminal of the traditional converter 700, typically coupled to the output capacitor ($C_{out}$) 712. Optionally, an input capacitor ($C_{in}$) 710 is coupled between the input source ($V_{in}$) and reference ground.

In embodiments, control logic 702 provides complimentary control signals with equal duty cycles to the gate terminals of the first transistor ($Q_1$) 704 and the second transistor ($Q_2$) 706. During the ON period ($T_{ON,HS}$) of the first transistor ($Q_1$) 704, the second transistor ($Q_2$) 706 is in the OFF condition. The inductor (L) 708 is charging, the output capacitor ($C_{out}$) 712 is charging, and providing current ($I_L$) to the output terminal of the traditional converter 700. In contrast, during the ON period ($T_{ON,LS}$) of the second transistor ($Q_2$) 706, the first transistor ($Q_1$) 704 is in the OFF condition, the inductor (L) 708 is coupled to reference ground via the second transistor ($Q_2$) 706, the inductor (L) 708 is discharging and providing current ($I_L$) to the output terminal of the traditional converter 700.

As such, the voltage at the switching node voltage (SW) alternates between the voltage at the input source ($V_{in}$) and reference ground. The controlled ON and OFF switching of the first transistor ($Q_1$) 704 and the second transistor ($Q_2$) 706 produce a fixed duty-cycle square waveform that, when filtered out by the inductor (L) 708 and output capacitor ($C_{out}$) 712, provides an output voltage ($V_{out}$) for a load.

In embodiments, a first input of the delay circuit 300 is coupled to the output of the converter 700 to provide the output voltage ($V_{out}$) of the converter 700 as an input voltage to the delay circuit 300. In embodiments, the control logic 702 provides the start command signal (START) as an input signal to the delay circuit 300. In embodiments, the supply voltage is provided to the delay circuit 300 as input source ($V_{in}$). In embodiments, the input source ($V_{in}$) is regulated before providing it to the delay circuit 300. In embodiments, where the output voltage ($V_{out}$) is fixed, the output voltage ($V_{out}$) provided to the delay circuit 300 is not needed.

The first timer circuit 302 receives the start command signal (START) as an input signal and the input source ($V_{in}$), and generates the output signal ($OUT_3$), fed to the second timer circuit 304. The second timer circuit 304 receives the output signal ($OUT_3$), the start command signal (START), and the reference voltage ($V_{ref}$). The second timer circuit 304 generates an output signal ($OUT_4$). In embodiments, the output signal ($OUT_4$) is provided from the delay circuit 300 to the control logic 702 to generate control signals for the ON and OFF switching of the switches of the switching converter.

Control logic 702 operates based on voltage-mode control and current-mode control to provide a balance between load responsiveness and input voltage variations.

In the voltage-mode control, the first comparator 714 (i.e., a Pulse-Width Modulation (PWM) comparator) continuously gauges the output voltage ($V_{out}$) of the converter 700 against a predetermined reference voltage ($V_{ref}$). The first comparator 714 serves as the primary sensor for output discrepancies. Should there be any divergence between the output voltage ($V_{out}$) and the reference voltage ($V_{ref}$), the first comparator 714 promptly responds by producing a first signal. This first signal acts as a guidepost, flagging whether the output voltage ($V_{out}$) needs to ascend or descend to align with the reference voltage ($V_{ref}$).

In the current-mode control, the second comparator 716 monitors the inductor current ($I_L$). By setting a limiting current ($I_{LIM}$), the second comparator 716 ensures that the inductor current ($I_L$) remains within safe bounds. If the inductor current ($I_L$) begins nudging close to the limiting current ($I_{LIM}$), the second comparator 716 generates a second signal, signaling the need to rein in the inductor current ($I_L$) before it breaches safety levels.

The confluence of the first and second signals is managed in the control logic 702. Control logic 702 orchestrates the feedback from the first comparator 714 and the second comparator 716. On one hand, it receives the first signal from the first comparator 714, urging voltage adjustments, and on the other, it gets cautionary alerts about current limits as the second signal from the second comparator 716. By navigating these dual inputs, the control logic 702 adjusts the PWM signal's duty cycle, which, in turn, modulates the switches in the switching element 720.

In embodiments, each switching time cycle ($T_{SW}$) of the converter 700 equals the sum of the ON period ($T_{ON,HS}$) of the first transistor ($Q_1$) 704 and the ON period ($T_{ON,LS}$) of the second transistor ($Q_2$) 706, represented as equation (15):

$T_{SW} = T_{ON,HS} + T_{ON,LS}$.

As the first transistor ($Q_1$) 704 is in the OFF condition during the ON period ($T_{ON,LS}$) of the second transistor ($Q_2$) 706, we can replace the ON period ($T_{ON,LS}$) of the second transistor ($Q_2$) 706 with the OFF period ($T_{OFF,HS}$) of the first transistor ($Q_1$) 704, for simplicity in the discussion.

Thus, equation (15) can be written as equation (16):

$T_{SW} = T_{ON,HS} + T_{OFF,HS}$.

To have a constant steady state switching time cycle ($T_{SW}$), the following condition can be asserted:

$$\frac{V_{out}}{V_{in}} = \frac{T_{ON,HS}}{T_{SW}}.$$

Based on equation (16), the condition can be represented as equation (17):

$$\frac{V_{out}}{V_{in}} = 1 - \frac{T_{OFF,HS}}{T_{SW}},$$

which can be simplified as equation (18):

$$T_{OFF,HS} = T_{SW} \times \left(1 - \frac{V_{out}}{V_{in}}\right).$$

Figure 8:
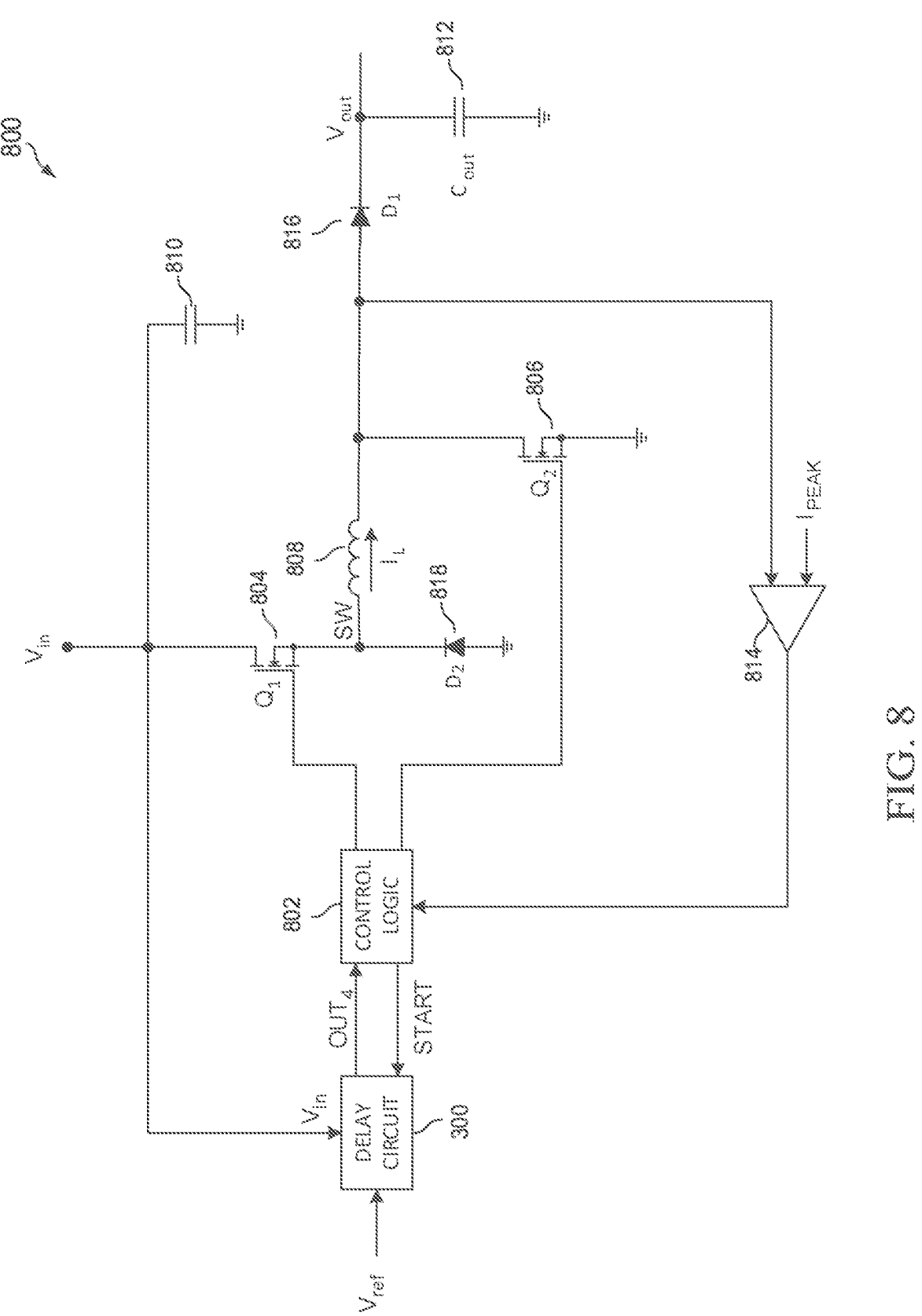
FIG. 8 is a schematic of an embodiment converter represented as a full-bridge converter without synchronous rectification.

FIG. 8 illustrates a schematic of an embodiment converter 800 represented as a full-bridge converter without synchronous rectification. Converter 800 includes the delay circuit 300, a control logic 802, a first transistor ($Q_1$) 804 (i.e., a high-side switch), a second transistor ($Q_2$) 806 (i.e., a low-side switch), an inductor (L) 808, an optional input capacitor ($C_{in}$) 810, an optional output capacitor ($C_{out}$) 812, a comparator 814, a first rectifier diode ($D_1$) 816, and a second rectifier diode ($D_2$) 818, which may (or may not) be arranged as shown. The delay circuit 300 is configured to provide a fixed OFF time (i.e., $T_{OFF}$). Embodiments of this disclosure provide a set value for the fixed OFF time.

Converter 800 may include additional components not shown. For example, converter 800 may include a respective gate driver coupled between the output of the control logic 802 and each switching element of the first transistor ($Q_1$) 804 and the second transistor ($Q_2$) 806.

The first transistor ($Q_1$) 804 is coupled between the input source ($V_{in}$) and the switching node (SW). The switching node (SW) is coupled to the cathode of the second rectifier diode ($D_2$) 818. The anode of the second rectifier diode ($D_2$) 818 is coupled to reference ground.

The inductor (L) 808 has a first terminal coupled to the switching node (SW) The second transistor ($Q_2$) 806 is coupled between the second terminal of the inductor (L) 808 and reference ground. The first transistor ($Q_1$) 804 and the second transistor ($Q_2$) 806 can be of the metal-oxide silicon field-effect transistors (MOSFETs) type. The first transistor ($Q_1$) 804 and the second transistor ($Q_2$) 806 can be n-channel type MOSFETs.

The second terminal of the inductor (L) 808 is coupled to the anode of the first rectifier diode ($D_1$) 816. The cathode of the first rectifier diode ($D_1$) 816 is coupled to the output capacitor ($C_{out}$) 812. Optionally, an input capacitor ($C_{in}$) 810 is coupled between the input source ($V_{in}$) and reference ground.

In embodiments, control logic 802 provides control signals with equal duty cycles to the gate terminals of the first transistor ($Q_1$) 804 and the second transistor ($Q_2$) 806 to activate or deactivate the first transistor ($Q_1$) 804 and the second transistor ($Q_2$) 806. The first transistor ($Q_1$) 804 and the second transistor ($Q_2$) 806 operate in tandem based on the control signals received at their respective control terminals within each cycle.

Figure 9:
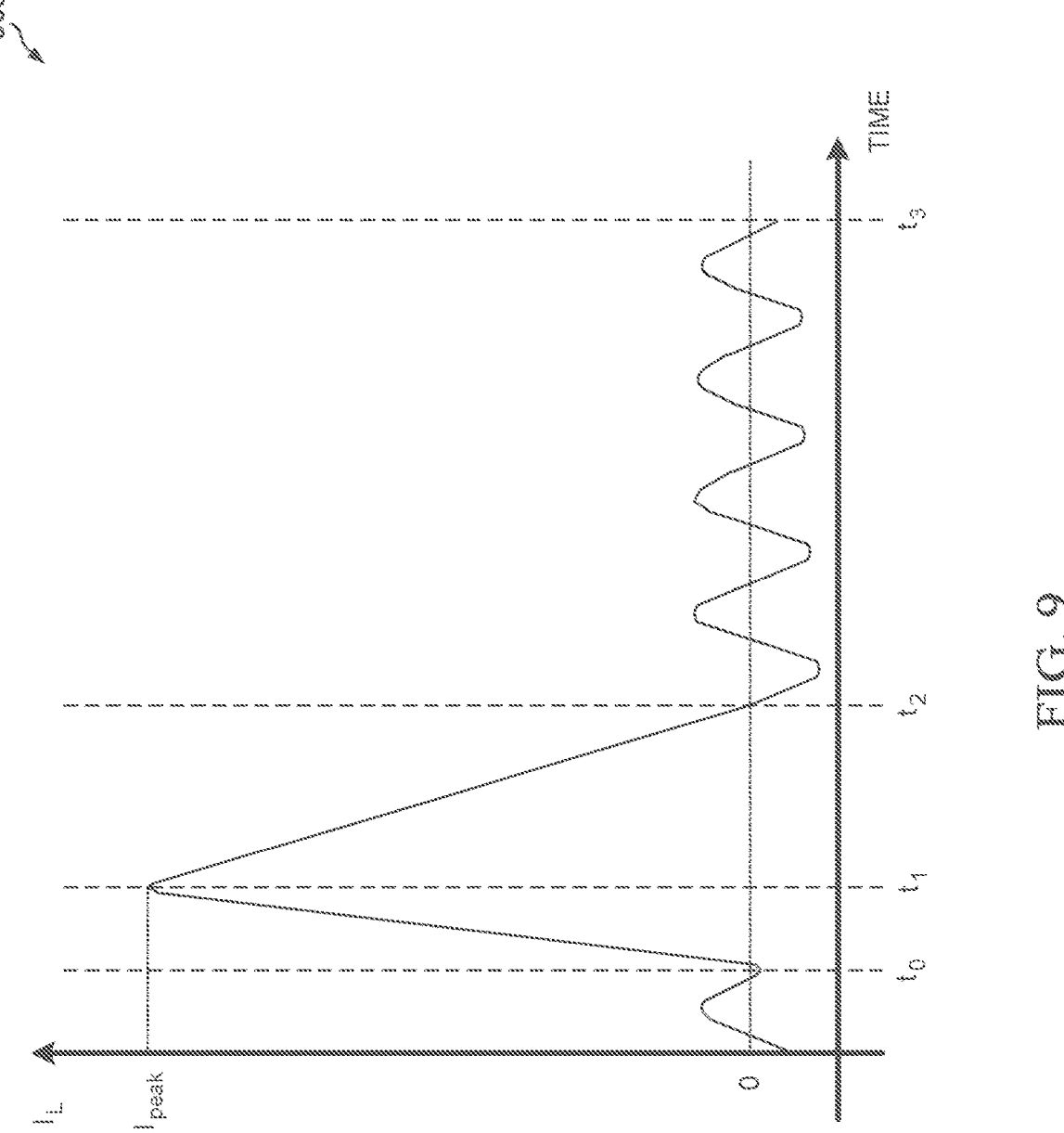
FIG. 9 is a timing diagram of the inductor current ($I_L$) of an inductor (L) of the converter of FIG. 8 during an operation cycle.

FIG. 9 illustrates a timing diagram of the inductor current ($I_L$) of the inductor (L) 808 of the converter 800 during an operation cycle. Embodiments of this disclosure are directed to regulating the operation of the output current ($I_{out}$).

Comparator 814, in tandem with the control logic 802 and the delay circuit 300, ensures that the converter 800 operates safely within Discontinuous Conduction Mode (DCM) parameters by regulating the switching of the first transistor ($Q_1$) 804 and the second transistor ($Q_2$) 806 based on real-time current readings. This not only guarantees efficient energy transfer but also shields the components from potential harm.

Control logic 802 operates based on peak current mode control, where the operation of the first transistor ($Q_1$) 804 (i.e., the high-side switch) and the second transistor ($Q_2$) 806 (i.e., the low-side switch) are based on a comparison of the inductor current ($I_L$) and a peak current ($I_{PEAK}$) reference value. In embodiments, converter 800 operates in DCM. A first input of the comparator 814 is fed by the inductor current ($I_L$). A second input of the comparator 814 is fed by a set peak current ($I_{PEAK}$) reference value. Comparator 814 continuously (i.e., constantly) contrasts the real-time value of the converter's current against the reference current.

During the ON time ($T_{ON}$), the inductor current ($I_L$) is in an upward ramp (i.e., charging) from time $t_0$ to time $t_1$. At time $t_0$, control logic 802 simultaneously activates the first transistor ($Q_1$) 804 and the second transistor ($Q_2$) 806. At time $t_1$, when the inductor current ($I_L$) reaches the fixed peak current ($I_{PEAK}$) reference value, control logic 802 simultaneously deactivates the first transistor ($Q_1$) 804 and the second transistor ($Q_2$) 806 to avoid saturation of the inductor (L) 808. Using the inductor, voltage-current relationship of the inductor (L) 808, the ON time ($T_{ON}$) from time to $t_0$ time $t_1$, can be represented by equation (18):

$$T_{ON} = L \times \frac{I_{PEAK}}{V_{in}}.$$

At the end of the ON time ($T_{ON}$), when the inductor current ($I_L$) reaches the peak current ($I_{PEAK}$) reference value, comparator 814 outputs a signal indicating that the threshold has been achieved. This signal is sent to the control logic 802. Control logic 802 interprets the signal from comparator 814 as an indication to turn OFF the high-side switch (i.e., the first transistor ($Q_1$) 804) and the low-side switch (i.e., the second transistor ($Q_2$) 806), thus terminating the inductor current's ($I_L$) upward ramp.

Embodiments of this disclosure provided the delay circuit 300 that allows for a fixed off time ($T_{OFF}$) starting from time $t_1$ and ending at time $t_3$. Between time $t_1$ and time $t_2$, the inductor current ($I_L$) is positive in value. The duration of the constant off time ($T_{OFFC}$) is such that the inductor current ($I_L$) reaches the zero value. Between time $t_2$ and time $t_3$, the inductor current ($I_L$) oscillates around the zero value due to the presence of the rectifier diodes. At time $t_3$, a next cycle of the converter 800 commences.

It is noted that the charge is only transferred to the output during the fixed off time from time $t_1$ to time $t_3$. This is because during the on time ($T_{ON}$), when the first transistor ($Q_1$) 804 and the second transistor ($Q_2$) 806 are turned ON from time $t_0$ to time $t_1$, the inductor (L) 808 is coupled to the input voltage ($V_{in}$) and reference ground. Thus, during the on time, no charge is transferred to the output. For the switching time cycle ($T_{SW}$), inductor (L) 808 will have an ON time ($T_{ON}$) during which it stores energy and an OFF time ($T_{OFF}$) during which it releases that energy to the load. The switching time cycle ($T_{SW}$) can be written as equation (19):

$$T_{SW} = \frac{Q_{OUT}}{I_{OUT}},$$

where the $Q_{OUT}$ is the output charge injected at each cycle.

The duration ($T_{OFFC}$) for the inductor current ($I_L$) to go from the fixed peak current ($I_{PEAK}$) reference value to zero (i.e., time $t_1$ to time $t_2$), depends on the output voltage ($V_{out}$) and the inductance of the inductor (L) 808. Using the inductor, voltage-current relationship, the duration ($T_{OFFC}$) can be represented by equation (20):

$$T_{OFFC} = L \times \frac{I_{PEAK}}{V_{out}}.$$

As the output voltage ($V_{out}$) and the inductance of the inductor (L) 808 are fixed values, the output charge ($Q_{out}$) injected at each cycle is constant, which can be represented as equation (21):

$$Q_{out} = \frac{1}{2} \times L \times \frac{I_{PEAK}^2}{V_{out}}.$$

To have a mean value constant current being transferred to the output the switching time cycle ($T_{SW}$) must be constant. Given equations (19) and (21), the switching time cycle ($T_{SW}$) can be written as equation (22):

$$T_{SW} = T_{ON} + T_{OFF} = \frac{1}{I_{OUT}} \times \frac{L}{2} \times \frac{I_{PEAK}^2}{V_{out}}.$$

Given equations (18) and (22), the fixed off time ($T_{OFF}$) can be written as equation (23):

$$T_{OFF} = \frac{L}{2 \times I_{out}} \times \frac{I_{PEAK}^2}{V_{out}} - L \times \frac{I_{PEAK}}{V_{in}}.$$

In embodiments, the control logic 802 provides the start command signal (START) as an input signal to the delay circuit 300. In embodiments, the supply voltage is provided to the delay circuit 300 as input source ($V_{in}$). In embodiments, the input source ($V_{in}$) is regulated before providing it to the delay circuit 300.

The first timer circuit 302 generates the output signal ($OUT_3$), fed to the second timer circuit 304. The second timer circuit 304 receives the output signal ($OUT_3$), the start command signal (START), and the reference voltage ($V_{ref}$). The second timer circuit 304 generates an output signal ($OUT_4$). In embodiments, the output signal ($OUT_4$) is provided from the delay circuit 300 to the control logic 802 to generate control signals for the ON and OFF switching of the switches of the switching converter.

As shown by equation (23), only the input source ($V_{in}$) is used as the output voltage ($V_{out}$) is a fixed value, resulting in $$\frac{L}{2 \times I_{out}} \times \frac{I_{PEAK}^2}{V_{out}}$$

a fixed time duration.

Figure 10:
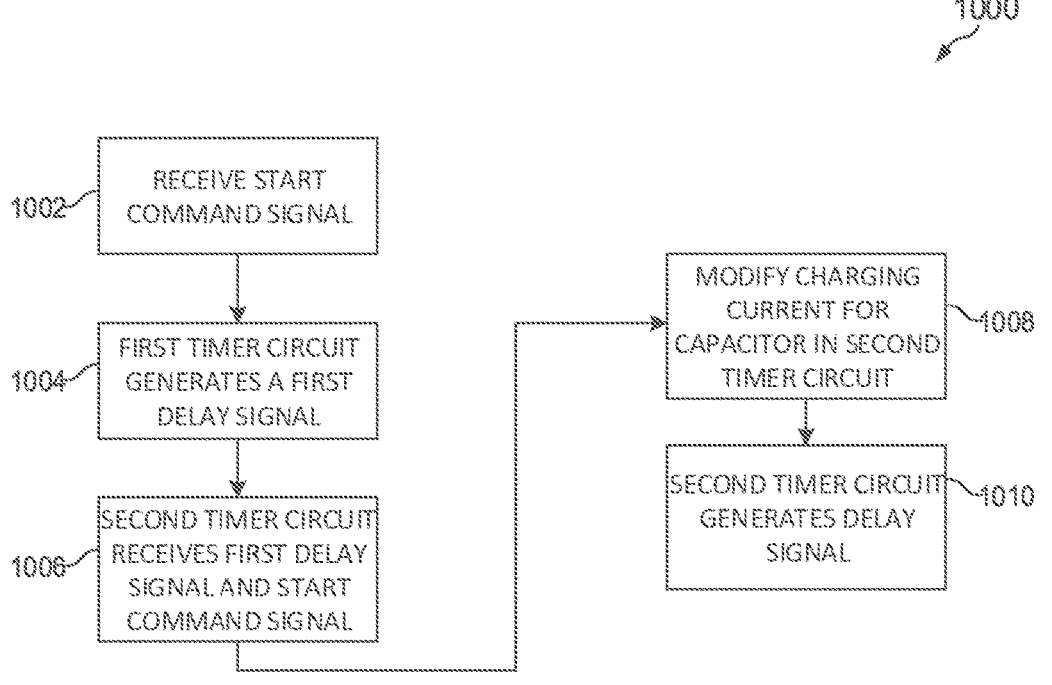
FIG. 10 is a flow chart of an embodiment method of operating a delay circuit.

FIG. 10 is a flow chart of an embodiment method 1000 of operating a delay circuit. In embodiments, the delay circuit is the delay circuit 300. In embodiments, the delay circuit is a delay circuit used in combination with a control logic of a converter. In such an embodiment, the control logic uses a time delay signal generated by the delay circuit to control the operation of the switching element of the converter.

At step 1002, the delay circuit receives a start command signal from the control logic.

At step 1004, a first timer circuit of the delay circuit generates a first delay signal. In embodiments, the first timer circuit includes a transconductance amplifier and a first capacitor. In embodiments, the first timer circuit has a first transfer characteristic equal to $$\frac{K_1}{V_{in}} \text{ or } \frac{K_1 \times V_{out}}{V_{in}},$$

where $K_1$ is a first multiplier factor associated with the transconductance amplifier, $V_{in}$ is a supply voltage for the converter, and $V_{out}$ is an output voltage of the converter.

At step 1006, a second timer circuit of the delay circuit receives the first delay signal and the start command signal (START) from the first timer circuit. The second timer circuit includes a first current generator, a second current generator, and a second capacitor.

At step 1008, a charging current provided by the second current generator or a sum of the first current generator and the second current generator for charging the second capacitor in the second timer circuit is modified based on the first delay signal.

At step 1010, the second timer circuit generates a delay signal used by the control logic to generate control signals for switching elements of the converter. The second timer circuit has a second transfer characteristic equal to $$K_2 - \frac{K_1}{V_{in}} \text{ or } K_2 - \frac{K_1 \times V_{out}}{V_{in}},$$

where $K_2$ is a second multiplier factor associated with the first current generator.

It is noted that all steps outlined in the flow charts of the method 1000 are not necessarily required and can be optional. Further, changes to the arrangement of the steps, removal of one or more steps and path connections, and addition of steps and path connections are similarly contemplated.

A first aspect relates to a delay circuit for a control logic in a converter. The delay circuit includes a first timer circuit having a transconductance amplifier and a first capacitor. The first timer circuit includes a first transfer characteristic equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter. The delay circuit includes a second timer circuit coupled to the first timer circuit. The second timer circuit includes a first current generator, a second current generator, and a second capacitor. The second timer circuit is configured to receive an output signal from the first timer circuit to modify a charging current provided by the second current generator or a sum of the first current generator and the second current generator to charge the second capacitor in the second timer circuit. The second timer circuit has a second transfer characteristic equal $$\beta - \frac{\alpha}{V_{in}} \text{ or } \beta - \frac{\alpha \times V_{out}}{V_{in}},$$

where $\beta$ is a second multiplier factor associated with the first current generator.

In a first implementation form of the delay circuit, according to the first aspect as such, the first timer circuit is a feedforward timer circuit. The output signal from the first timer circuit has a time delay ($T_{delay}$) equal to $$T_{delay} = \frac{V_{out}}{V_{in}} \times \frac{R_f \times C_1}{K},$$

where $C_1$ is the capacitance of the first capacitor, $R_f$ is a feedforward resistor of the transconductance amplifier, and K is a third multiplier factor.

In a second implementation form of the delay circuit, according to the first aspect as such or any preceding implementation form of the first aspect, the second timer circuit is a fixed delay timer circuit. A second output signal from the second timer circuit has a time delay ($T_{delay}$) equal to $$T_{delay} = \frac{V_{ref}}{I_0} \times C_2 - \frac{V_{out}}{V_{in}} \times \frac{R_f \times C_1}{\alpha} \times \beta,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

In a third implementation form of the delay circuit, according to the first aspect as such or any preceding implementation form of the first aspect, the second timer circuit is a fixed delay timer circuit. A second output signal from the second timer circuit has a time delay ($T_{delay}$) equal to $$T_{delay} = \frac{V_{ref}}{I_0} \times C_2 - \frac{V_{out}}{V_{in}} \times R_f \times C_1,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

In a fourth implementation form of the delay circuit, according to the first aspect as such or any preceding implementation form of the first aspect, the first timer circuit is a feedforward timer circuit. The second timer circuit is a fixed delay timer circuit.

In a fifth implementation form of the delay circuit, according to the first aspect as such or any preceding implementation form of the first aspect, the delay circuit begins generating a delay signal at an output of the second timer circuit in response to a change in logic of a start command signal communicated from the control logic. The control logic is configured to generate control signals for switching elements of the converter based on the delay signal received from the delay circuit.

In a sixth implementation form of the delay circuit, according to the first aspect as such or any preceding implementation form of the first aspect, the delay signal has a first slope corresponding to a first charging current provided by the sum of the first current generator and the second current generator. The delay signal has a second slope corresponding to a second charging current provided only by the second current generator.

A second aspect relates to a method of operating a delay circuit for a control logic in a converter. The method includes receiving, by the delay circuit, a start command signal from the control logic; generating, by a first timer circuit of the delay circuit, a first delay signal, the first timer circuit comprising a transconductance amplifier and a first capacitor, the first timer circuit having a first transfer characteristic equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter; receiving, by a second timer circuit of the delay circuit, the first delay signal and the start command signal from the first timer circuit, the second timer circuit comprising a first current generator, a second current generator, and a second capacitor; modifying a charging current provided by the second current generator or a sum of the first current generator and the second current generator for charging the second capacitor in the second timer circuit based on the first delay signal; and generating, by the second timer circuit, a second delay signal used by the control logic to generate control signals for switching elements of the converter, the second timer circuit having a second transfer characteristic equal to $$\beta - \frac{\alpha}{V_{in}} \text{ or } \beta - \frac{\alpha \times V_{out}}{V_{in}},$$

where $\beta$ is a second multiplier factor associated with the first current generator.

In a first implementation form of the method, according to the second aspect as such, the first timer circuit is a feedforward timer circuit. The first delay signal from the first timer circuit has a time delay ($T_{delay}$) equal to $$T_{delay} = \frac{V_{out}}{V_{in}} \times \frac{R_f \times C_1}{\alpha},$$

where $C_1$ is the capacitance of the first capacitor and $R_f$ is a feedforward resistor of the transconductance amplifier.

In a second implementation form of the method, according to the second aspect as such or any preceding implementation form of the second aspect, the second timer circuit is a fixed delay timer circuit. The second delay signal from the second timer circuit has a time delay ($T_{delay}$) equal to $$T_{delay} = \frac{V_{ref}}{I_0} \times C_2 - \frac{V_{out}}{V_{in}} \times \frac{R_f \times C_1}{\alpha} \times \beta,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

In a third implementation form of the method, according to the second aspect as such or any preceding implementation form of the second aspect, the second timer circuit is a fixed delay timer circuit. The second delay signal from the second timer circuit has a time delay ($T_{delay}$) equal to $$T_{delay} = \frac{V_{ref}}{I_0} \times C_2 - \frac{V_{out}}{V_{in}} \times R_f \times C_1,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

In a fourth implementation form of the method, according to the second aspect as such or any preceding implementation form of the second aspect, the first timer circuit is a feedforward timer circuit. The second timer circuit is a fixed delay timer circuit.

In a fifth implementation form of the method, according to the second aspect as such or any preceding implementation form of the second aspect, the delay circuit begins generating the second delay signal at an output of the second timer circuit in response to a change in logic of a start command signal communicated from the control logic. The control logic is configured to generate control signals for switching elements of the converter based on the second delay signal received from the delay circuit.

In a sixth implementation form of the method, according to the second aspect as such or any preceding implementation form of the second aspect, the second delay signal has a first slope corresponding to a first charging current provided by the sum of the first current generator and the second current generator. The second delay signal has a second slope corresponding to a second charging current provided only by the second current generator.

A third aspect relates to a converter. The converter includes a switching element; a control logic configured to control the switching operations of the switching element; and a delay circuit coupled to the control logic. The delay circuit includes a first timer circuit having a transconductance amplifier and a first capacitor. The first timer circuit has a first transfer characteristic equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter. The delay circuit further includes a second timer circuit coupled to the first timer circuit. The second timer circuit has a first current generator, a second current generator, and a second capacitor. The second timer circuit is configured to receive an output signal from the first timer circuit to modify a charging current provided by the second current generator or a sum of the first current generator and the second current generator to charge the second capacitor in the second timer circuit. The second timer circuit has a second transfer characteristic equal to $$\beta - \frac{\alpha}{V_{in}} \text{ or } \beta - \frac{\alpha \times V_{out}}{V_{in}},$$

where $\beta$ is a second multiplier factor associated with the first current generator.

In a first implementation form of the converter, according to the third aspect as such, the first timer circuit is a feedforward timer circuit. The output signal from the first timer circuit has a time delay ($T_{delay}$) equal to $$T_{delay} = \frac{V_{out}}{V_{in}} \times \frac{R_f \times C_1}{\alpha},$$

where $C_1$ is the capacitance of the first capacitor and $R_f$ is a feedforward resistor of the transconductance amplifier.

In a second implementation form of the converter, according to the third aspect as such or any preceding implementation form of the third aspect, the second timer circuit is a fixed delay timer circuit. A second output signal from the second timer circuit has a time delay ($T_{delay}$) equal to $$T_{delay} = \frac{V_{ref}}{I_0} \times C_2 - \frac{V_{out}}{V_{in}} \times \frac{R_f \times C_1}{\alpha} \times \beta,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

In a third implementation form of the converter, according to the third aspect as such or any preceding implementation form of the third aspect, the second timer circuit is a fixed delay timer circuit. A second output signal from the second timer circuit has a time delay ($T_{delay}$) equal to $$T_{delay} = \frac{V_{ref}}{I_0} \times C_2 - \frac{V_{out}}{V_{in}} \times R_f \times C_1,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

In a fourth implementation form of the converter, according to the third aspect as such or any preceding implementation form of the third aspect, the first timer circuit is a feedforward timer circuit and the second timer circuit is a fixed delay timer circuit.

In a fifth implementation form of the converter, according to the third aspect as such or any preceding implementation form of the third aspect, the delay circuit begins generating a delay signal at an output of the second timer circuit in response to a change in logic of a start command signal communicated from the control logic. The control logic is configured to generate control signals for switching elements of the converter based on the delay signal received from the delay circuit.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A delay circuit for a control logic in a converter, the delay circuit comprising:

a first timer circuit comprising a transconductance amplifier and a first capacitor, the first timer circuit having a first transfer characteristic equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter; and a second timer circuit coupled to the first timer circuit, the second timer circuit comprising a first current generator, a second current generator, and a second capacitor, the second timer circuit configured to receive an output signal from the first timer circuit to modify a charging current provided by the second current generator or a sum of the first current generator and the second current generator to charge the second capacitor in the second timer circuit, the second timer circuit having a second transfer characteristic equal to $$\beta - \frac{\alpha}{V_{in}} \text{ or } \beta - \frac{\alpha \times V_{out}}{V_{in}},$$

where $\beta$ is a second multiplier factor associated with the first current generator.

2. The delay circuit of claim 1, wherein the first timer circuit is a feedforward timer circuit, and wherein the output signal from the first timer circuit has a time delay ($T_{delay}$) equal to $$T_{delay} = \frac{V_{out}}{V_{in}} \times \frac{R_f \times C_1}{K},$$

where $C_1$ is the capacitance of the first capacitor, $R_f$ is a feedforward resistor of the transconductance amplifier, and K is a third multiplier factor.

3. The delay circuit of claim 1, wherein the second timer circuit is a fixed delay timer circuit, and wherein a second output signal from the second timer circuit has a time delay ($T_{delay}$) equal to $$T_{delay} = \frac{V_{ref}}{I_0} \times C_2 - \frac{V_{out}}{V_{in}} \times \frac{R_f \times C_1}{\alpha} \times \beta,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

4. The delay circuit of claim 1, wherein the second timer circuit is a fixed delay timer circuit, and wherein a second output signal from the second timer circuit has a time delay ($T_{delay}$) equal to $$T_{delay} = \frac{V_{ref}}{I_0} \times C_2 - \frac{V_{out}}{V_{in}} \times R_f \times C_1,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

5. The delay circuit of claim 1, wherein the first timer circuit is a feedforward timer circuit, and wherein the second timer circuit is a fixed delay timer circuit.

6. The delay circuit of claim 1, wherein the delay circuit begins generating a delay signal at an output of the second timer circuit in response to a change in logic of a start command signal communicated from the control logic, the control logic configured to generate control signals for switching elements of the converter based on the delay signal received from the delay circuit.

7. The delay circuit of claim 6, wherein the delay signal has a first slope corresponding to a first charging current provided by the sum of the first current generator and the second current generator, and wherein the delay signal has a second slope corresponding to a second charging current provided only by the second current generator.

8. A method of operating a delay circuit for a control logic in a converter, the method comprising:

receiving, by the delay circuit, a start command signal from the control logic;

generating, by a first timer circuit of the delay circuit, a first delay signal, the first timer circuit comprising a transconductance amplifier and a first capacitor, the first timer circuit having a first transfer characteristics equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter;

receiving, by a second timer circuit of the delay circuit, the first delay signal and the start command signal from the first timer circuit, the second timer circuit comprising a first current generator, a second current generator, and a second capacitor;

modifying a charging current provided by the second current generator or a sum of the first current generator and the second current generator for charging the second capacitor in the second timer circuit based on the first delay signal; and generating, by the second timer circuit, a second delay signal used by the control logic to generate control signals for switching elements of the converter, the second timer circuit having a second transfer characteristic equal to $$\beta - \frac{\alpha}{V_{in}} \text{ or } \beta - \frac{\alpha \times V_{out}}{V_{in}},$$

where $\beta$ is a second multiplier factor associated with the first current generator.

9. The method of claim 8, wherein the first timer circuit is a feedforward timer circuit, and wherein the first delay signal from the first timer circuit has a time delay ($T_{delay}$) equal to $$T_{delay} = \frac{V_{out}}{V_{in}} \times \frac{R_f \times C_1}{\alpha},$$

where $C_1$ is the capacitance of the first capacitor and $R_f$ is a feedforward resistor of the transconductance amplifier.

10. The method of claim 8, wherein the second timer circuit is a fixed delay timer circuit, and wherein the second delay signal from the second timer circuit has a time delay ($T_{delay}$) equal to $$T_{delay} = \frac{V_{ref}}{I_0} \times C_2 - \frac{V_{out}}{V_{in}} \times \frac{R_f \times C_1}{\alpha} \times \beta,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

11. The method of claim 8, wherein the second timer circuit is a fixed delay timer circuit, and wherein the second delay signal from the second timer circuit has a time delay ($T_{delay}$) equal to $$T_{delay} = \frac{V_{ref}}{I_0} \times C_2 - \frac{V_{out}}{V_{in}} \times R_f \times C_1,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

12. The method of claim 8, wherein the first timer circuit is a feedforward timer circuit, and wherein the second timer circuit is a fixed delay timer circuit.

13. The method of claim 8, wherein the delay circuit begins generating the second delay signal at an output of the second timer circuit in response to a change in logic of a start command signal communicated from the control logic, the control logic configured to generate control signals for switching elements of the converter based on the second delay signal received from the delay circuit.

14. The method of claim 13, wherein the second delay signal has a first slope corresponding to a first charging current provided by the sum of the first current generator and the second current generator, and wherein the second delay signal has a second slope corresponding to a second charging current provided only by the second current generator.

15. A converter, comprising:

a switching element;

a control logic configured to control switching operations of the switching element; and a delay circuit coupled to the control logic, the delay circuit comprising:

a first timer circuit comprising a transconductance amplifier and a first capacitor, the first timer circuit having a first transfer characteristic equal to $$\frac{\alpha}{V_{in}} \text{ or } \frac{\alpha \times V_{out}}{V_{in}},$$

where $\alpha$ is a first multiplier factor associated with the transconductance amplifier, $V_{in}$ is a supply voltage for the converter, and $V_{out}$ is an output voltage of the converter; and a second timer circuit coupled to the first timer circuit, the second timer circuit comprising a first current generator, a second current generator, and a second capacitor, the second timer circuit configured to receive an output signal from the first timer circuit to modify a charging current provided by the second current generator or a sum of the first current generator and the second current generator to charge the second capacitor in the second timer circuit, the second timer circuit having a second transfer characteristic equal to $$\beta - \frac{\alpha}{V_{in}} \text{ or } \beta - \frac{\alpha \times V_{out}}{V_{in}},$$

where $\beta$ is a second multiplier factor associated with the first current generator.

16. The converter of claim 15, wherein the first timer circuit is a feedforward timer circuit, and wherein the output signal from the first timer circuit has a time delay ($T_{delay}$) equal to $$T_{delay} = \frac{V_{out}}{V_{in}} \times \frac{R_f \times C_1}{\alpha},$$

where $C_1$ is the capacitance of the first capacitor and $R_f$ is a feedforward resistor of the transconductance amplifier.

17. The converter of claim 15, wherein the second timer circuit is a fixed delay timer circuit, and wherein a second output signal from the second timer circuit has a time delay ($T_{delay}$) equal to $$T_{delay} = \frac{V_{ref}}{I_0} \times C_2 - \frac{V_{out}}{V_{in}} \times \frac{R_f \times C_1}{\alpha} \times \beta,$$

24 where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

18. The converter of claim 15, wherein the second timer circuit is a fixed delay timer circuit, and wherein a second output signal from the second timer circuit has a time delay ($T_{delay}$) equal to $$T_{delay} = \frac{V_{ref}}{I_0} \times C_2 - \frac{V_{out}}{V_{in}} \times R_f \times C_1,$$

where $C_1$ is the capacitance of the first capacitor, $C_2$ is the capacitance of the second capacitor, $V_{ref}$ is a reference voltage, $I_0$ is a current value generated by the second current generator, and $R_f$ is a feedforward resistor of the transconductance amplifier.

19. The converter of claim 15, wherein the first timer circuit is a feedforward timer circuit, and wherein the second timer circuit is a fixed delay timer circuit.

20. The converter of claim 15, wherein the delay circuit begins generating a delay signal at an output of the second timer circuit in response to a change in logic of a start command signal communicated from the control logic, the control logic configured to generate control signals for switching elements of the converter based on the delay signal received from the delay circuit.

* * * * *